United States Patent
Vetter

(10) Patent No.: US 9,880,297 B2
(45) Date of Patent: Jan. 30, 2018

(54) QUALITY CONTROLLED RECONSTRUCTION FOR ROBOTIC NAVIGATED NUCLEAR PROBE IMAGING

(71) Applicant: Siemens Healthcare GmbH, Erlangen (DE)

(72) Inventor: Christoph Vetter, East Windsor, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 14 days.

(21) Appl. No.: 14/481,089

(22) Filed: Sep. 9, 2014

(65) Prior Publication Data

US 2016/0070007 A1    Mar. 10, 2016

(51) Int. Cl.
| | | |
|---|---|---|
| G01J 1/42 | (2006.01) | |
| G01T 1/29 | (2006.01) | |
| G01T 1/17 | (2006.01) | |
| G06T 11/00 | (2006.01) | |
| G01T 1/161 | (2006.01) | |
| G01T 1/164 | (2006.01) | |

(52) U.S. Cl.
CPC ............ *G01T 1/2964* (2013.01); *G01T 1/161* (2013.01); *G01T 1/1648* (2013.01); *G01T 1/17* (2013.01); *G01T 1/2985* (2013.01); *G06T 11/003* (2013.01)

(58) Field of Classification Search
CPC .. G01T 1/17; G01T 7/00; G01T 1/167; G01T 1/36; G01T 1/178
See application file for complete search history.

(56) References Cited

U.S. PATENT DOCUMENTS

| | | | | |
|---|---|---|---|---|
| 8,213,700 | B2* | 7/2012 | Periaswamy | G06K 9/00 |
| | | | | 382/131 |
| 2008/0292217 | A1* | 11/2008 | Claus | G06T 11/006 |
| | | | | 382/304 |
| 2011/0210734 | A1* | 9/2011 | Darrow | G01R 33/543 |
| | | | | 324/309 |
| 2012/0076389 | A1* | 3/2012 | Vija | G06T 11/006 |
| | | | | 382/132 |
| 2012/0093383 | A1* | 4/2012 | Claus | A61B 6/032 |
| | | | | 382/131 |
| 2012/0157827 | A1* | 6/2012 | Ross | G06T 11/006 |
| | | | | 600/425 |
| 2013/0261446 | A1* | 10/2013 | Paladini | A61B 5/0064 |
| | | | | 600/436 |

OTHER PUBLICATIONS

T. Wendeler, et al., "First demonstration of 3-D lymphatic mapping in breast cancer using freehand SPECT," Eur J Nucl Med Mol Imaging, pp. 1-10, 2010.

(Continued)

*Primary Examiner* — David Porta
*Assistant Examiner* — Mamadou Faye

(57) ABSTRACT

Robotic navigation is provided in nuclear probe imaging. Adaptive reconstruction is provided. A measure of quality of the reconstruction is used as a feedback to determine when sufficient sampling has occurred. For example, once a predetermined number of separate lesions are indicated in the reconstruction, the quality of the reconstruction is considered sufficient.

15 Claims, 3 Drawing Sheets

(56) References Cited

OTHER PUBLICATIONS

L. A. Shepp, et al., "Maximum Likelihood Reconstruction for Emission Tomography," IEEE Transactions on Medical Imaging, vol. MI-1, No. 2, pp. 113-122, 1982.
C. Vetter, et al., "SPECT Reconstruction on the GPU," Abstract, Proceedings of SPIE 6913, pp. 69132R-69132R-9, 2008.
A. Kak, et al., "Principles of Computerized Tomographic Imaging," Webpage, http://www.slaney.org/pct/pct-toc.html, pp. 1-4, 2014.

* cited by examiner

QUALITY CONTROLLED RECONSTRUCTION FOR ROBOTIC NAVIGATED NUCLEAR PROBE IMAGING

BACKGROUND

The present embodiments relate to medical imaging. In particular, imaging with a nuclear probe is provided.

Diagnostic medical modalities, such as computed tomography (CT), magnetic resonance (MR), and ultrasound, acquire detailed images. The images depict anatomical structures, such as location of internal organs and tumors. Other modalities, such as positron emission tomography (PET) and single positron emission computed tomography (SPECT), may visualize functional changes or information. PET and SPECT may show areas of cancerous growth or other operation of anatomy, but with less or no details about the surrounding anatomy.

In nuclear medicine, hand-held nuclear activity devices, such as a gamma probe or a beta probe, are capable of detecting the uptake of injected tumor-seeking radiopharmaceuticals. Gamma probes, for example, are used in parathyroid and sentinel lymph node surgery. The gamma probes provide an audible signal to locate regions where injected radionuclides are present. The locations detected with a gamma probe may be visualized rather than just relying on an audible signal. A tracking system measures the position of the gamma probe while acquiring data to compute the images. Reconstructing these intra-operative 3-dimensional functional images provides valuable spatial information for a more accurate and less invasive surgery. However, high variability of scanning patterns between different operators as well as a lack of quality-control may result in repetition. The reconstructed image may have inadequate quality, requiring the process to be performed again. The tightly orchestrated work flow during surgery is delayed when unnecessary time is spent for scanning the volume of interest. Even with robotic positioning, unnecessary time may be used oversampling for accurate reconstruction.

BRIEF SUMMARY

By way of introduction, the preferred embodiments described below include methods, systems, instructions, and computer readable media for robotic navigation in nuclear probe imaging. Adaptive reconstruction is provided. A measure of quality of the reconstruction is used as a feedback to determine when sufficient sampling has occurred. For example, once a pre-determined number of separate lesions are indicated in the reconstruction, the quality of the reconstruction is considered sufficient. Until sufficient sampling occurs, the scanning is repeated to gather more samples.

In a first aspect, a system is provided for robotic navigation in nuclear probe imaging. A robotic assembly connects with a nuclear detector for detecting radiation. The robotic assembly is operable to move the nuclear detector relative to a patient. A processor is configured to reconstruct a volume from the detected radiation, to control the robotic assembly to further move the nuclear detector relative to the patient where a calculated quality of the reconstructed volume is below a threshold measure, and to repeat the reconstruction of the volume from the detected radiation and further detected radiation from the further movement.

In a second aspect, a method is provided for robotic navigation in nuclear probe imaging. A detector is first moved to regularly spaced locations about the patient. First radiation samples are detected with the detector at the regularly spaced locations of the first moving. The detector is aligned such that the radiation being detected is from within the patient. A first three-dimensional distribution is reconstructed from the first radiation samples. The first three-dimensional distribution represents the patient. A first number of regions are segmented from the first three-dimensional distribution. The first number of regions from the first three-dimensional distribution is compared to a pre-determined number. The detector is moved to the regularly spaced or other locations about the patient where the first number of the regions is not the pre-determined number. Second radiation samples are detected with the detector at the regularly spaced or other locations of the second moving. A second three-dimensional distribution is reconstructed from the first and second radiation samples. The second three-dimensional distribution represents the patient. A second number of regions is segmented from the second three-dimensional distribution. The second number of regions from the second three-dimensional distribution is compared to the pre-determined number. An image from the reconstructed second three-dimensional distribution is displayed where the second number of regions equals the pre-determined number.

In a third aspect, a non-transitory computer readable storage medium has stored therein data representing instructions executable by a programmed processor for robotic navigation in nuclear probe imaging. The storage medium includes instructions for controlling a robot to position a nuclear probe at different locations relative to a patient in a sequence of scans of the patient, progressively reconstructing a portion of the patient from data of the nuclear probe after each of the scans, and terminating the sequence when a measure of a most recent reconstruction of the portion satisfies a criteria.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Cancerous lesions that are visible based on uptake of radiotracer agents may be identified. By providing detection of uptake during a surgical procedure, the surgeon may be assisted in resecting lesions. For example, positive lymph nodes are resected from a patient's breast using, in part, detection of the radiotracer agents. A robotic system positioning a probe acquires data in real-time with the surgical operation. The robotic system is less spatially limiting than a PET/SPECT scanner, allowing use during surgery. Accurate sentinel lymph node (SLN) mapping, localization, and/or characterization may be important in staging the cancer and individualizing cancer treatment for maximum benefit.

The robotic system automatically performs the scanning procedure for reconstruction. For example, a robot positions a detector to collect spatial samples from the region of interest on the patient. Automatic navigation of a collimated nuclear probe may assist with mapping, localization and/or characterization. Automatic scanning of the patient anatomy may enhance reconstruction quality due to better (denser) and more regularly or evenly spaced sampling. Using a robotic system also improves the accuracy of the measurements compared to optical tracking of the probe. The robotic scanning may provide for quicker sampling.

To limit the sampling while providing sufficient information, an adaptive, quality-controlled image reconstruction is performed for nuclear probe imaging with robotic navigation. The scanning and reconstruction are driven by a quality measure. Prior information, like a routinely performed scintigraphy or a full single photon emission computed tomography (SPECT) scan, is used to determine the number of nodes of interest or other quality that may be represented in a reconstruction. The robotic scanning with the probe is then performed until either a time limit is reached or the correct number of nodes may be clearly separated in the reconstructed scan. Using the quality feedback may enable faster, quality-controlled scan times using a robotic arm.

Figure 1:
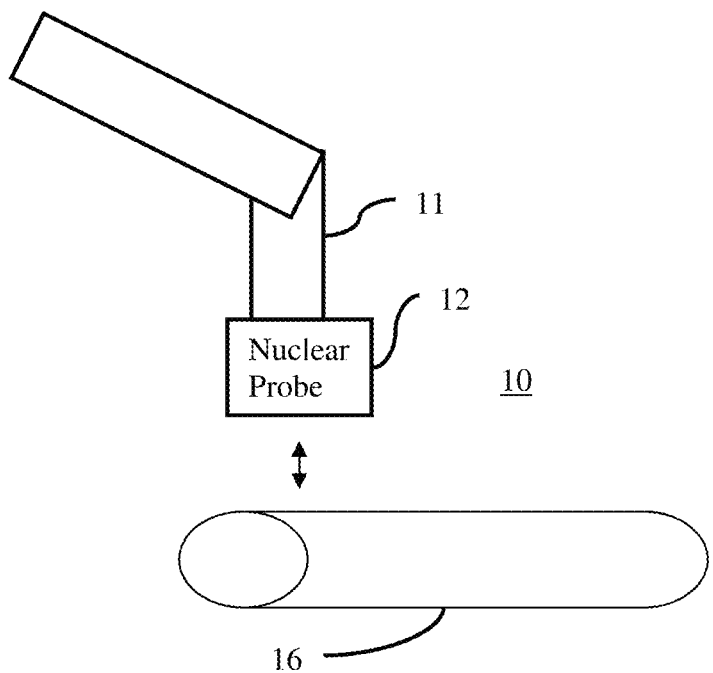
FIG. 1 is an illustration of one embodiment of an arrangement for robotic navigation in nuclear probe imaging.
Figure 2:
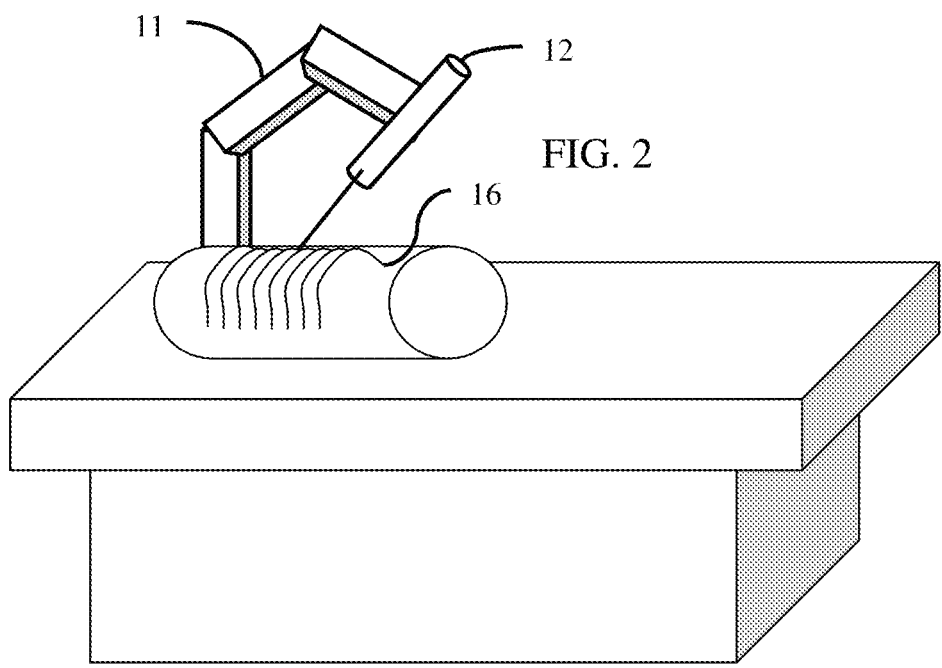
FIG. 2 is an illustration of another embodiment of an arrangement for robotic navigation in nuclear probe imaging.
Figure 3:
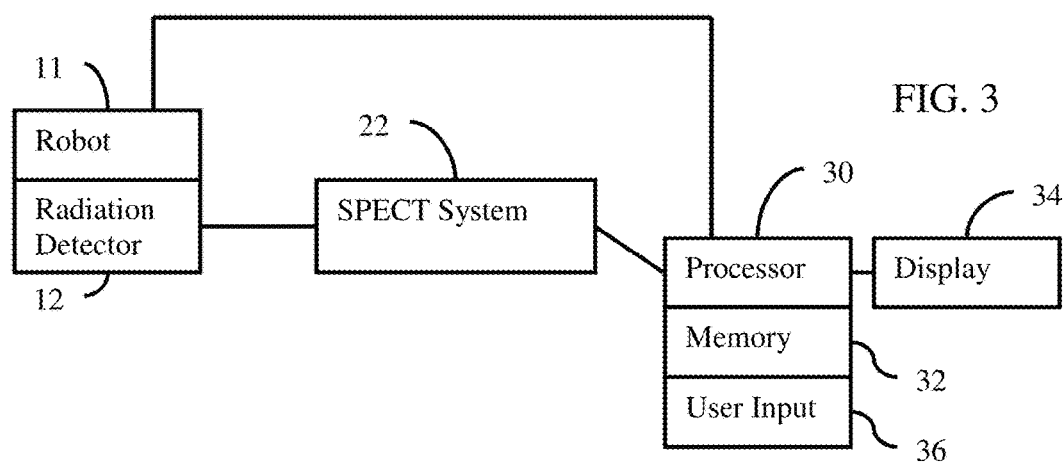
FIG. 3 is a block diagram of a system for robotic navigation in nuclear probe imaging, according to one embodiment.

FIGS. 1-3 show different embodiments of a system for robotic navigation in nuclear probe imaging. FIGS. 1 and 2 show the arrangement of the robotic assembly 11 and nuclear probe 12 relative to a patient. FIG. 3 shows a system with the robotic assembly 11, nuclear probe 12, and SPECT system 22 connected to processing components for control, reconstruction, user interaction, and/or display.

The system of FIG. 3 includes the robotic assembly 11, nuclear probe 12, a single photon emission computed tomography (SPECT) system 22, a processor 30, a memory 32, a user input 36, and a display 34. Additional, different, or fewer components may be provided. For example, a network or network connection is provided, such as for networking with a medical imaging network or data archival system. As another example, a preoperative imaging system, such as a computed tomography or magnetic resonance imaging system, is provided. In another example, the processor 30 is part of or also performs the functions of the SPECT system 22 and/or other imaging system, computer or workstation. In other examples, the processor 30 is a SPECT processor or computer and a separate SPECT scanner as the SPECT system 22 is not provided.

The memory 32, user input 36, processor 30, and display 34 are part of a medical imaging system, such as the SPECT system 22, x-ray, computed tomography, magnetic resonance, positron emission, or other system. Alternatively, the memory 32, user input 36, processor 30, and display 34 are part of an archival and/or image processing system, such as associated with a medical records database workstation or server. In other embodiments, the memory 32, user input 36, processor 30, and display 34 are a personal computer, such as desktop or laptop, a workstation, a server, a network, or combinations thereof. In yet other embodiments, the memory 32, user input 36, processor 30, and display 34 are part of a robotic nuclear imaging system for intra-operative assistance in locating lesions or tumors with a radionuclide.

The nuclear probe 12 is a nuclear detector for detecting radiation. The nuclear probe 12 is a gamma, beta, or other probe for detecting radiation. For example, the nuclear probe 12 includes a Geiger-Muller tube or scintillation counter for detecting radiation following interstitial injection of a radionuclide. The nuclear probe 12 has a single detector and generally pencil shape. Alternatively, an array of detectors may be provided, and/or other shapes may be used. An array of detectors may provide higher quality, but is heavier so using the robotic assembly 11 enables use of the array.

As shown in FIG. 3, the nuclear probe 12 electrically connects with the SPECT system 22. For connection with the SPECT system 22, a single coaxial or other cable is provided. As shown in FIGS. 1 and 2, the nuclear probe 12 physically connects with the robotic assembly 11. The robotic assembly 11 holds, carries, releasably attaches to, fixedly includes, is formed on, around or against, or otherwise connects with the nuclear probe 12.

The nuclear probe 12 is configured to detect radiation along a line or cone. Radiation signals (e.g., gamma rays or light caused by gamma rays) are converted to electrical energy. The detector detects radiation from the beam (e.g., cone) region. Radionuclides emit gamma radiation or emitted positrons cause release of gamma radiation.

The probe 12 is directional. The sensitive region for detecting radiation is in a beam or cone along a line extending from the nuclear probe 12. The beam is converging, collimated, and/or diverging. Any radiation emitted within the sensitive region is detected. For example, radiation emitted from within a cone shaped region extending from the nuclear probe 12 is detected. The nuclear probe 12 does not resolve the depth or distance from the radiation source and the probe 12. The nuclear probe 12 may not indicate the lateral position within the beam of the source of radiation. Accordingly, the detected radiation is a projection of radiation sources within the beam at a given detection time. Readings are taken for each position of the probe 12 as the probe 12 is moved, providing a projection type sampling of the radiation over a three-dimensional volume.

The projections along lines originating at different locations and/or at different angles within the volume are detected. Where the single element is tilted at different angles and the probe 12 is moved, the radiation distribution in three-dimensions may be measured.

The SPECT system 22 includes a computer (e.g., the processor 30) for reconstructing the radiation detected at the probe 12. The SPECT system 22 is a standalone device, such as a full SPECT system, a workstation, or a computer. Alternatively, one or more processors of another system perform the reconstruction without other devices. The SPECT system 22 may be implemented in the processor 30 without a separate device. In other embodiments, a positron emission tomography (PET) system is used instead of the SPECT system 22.

The robotic assembly 11 connects with and moves the nuclear probe 12. The robotic assembly 11 provides any number of degrees of translation and/or rotation, such as having six (three translation and three rotation) degrees of freedom with or without limits.

The robotic assembly 11 includes one or more robot arms and joints. One of the robot arms connects with the nuclear probe 12, either directly or indirectly (e.g., through a joint, extension, or other devices connected with the arm). The robotic assembly 11 includes a base configured to be stationary during movement of the robot arm and relative to the three-dimensional scanner 39 and/or patient. The base may be a plate or other structure fixed to the floor, wall, ceiling, or patient table. FIG. 1 shows the robotic assembly 11 with a ceiling mount. FIG. 2 shows the robotic assembly 11 with a floor or patient table mount. Alternatively, the base is moveable, such as being on a track.

An active robotic assembly 11 is used, such as including sensors, motors, and controllers for positioning the probe 12. The robotic assembly 11 positions the nuclear probe 12 at different positions relative to the patient. For radiation detection, the positions may be spaced slightly away from the patient. FIG. 1 shows a double arrow representing the probe 12 being positioned out of contact with the patient, such as at one or more centimeters (e.g., 1-3 centimeters). The relative position of the probe 12 may be indicated by the robotic sensors instead of or in addition to data from other position detection systems.

In one example embodiment, the probe 12 is mounted onto an articulated robot arm rather than being used freehand. The probe's motion trajectory may be planned and known upfront, rather than being computed from freehand motion subject to inaccuracies. Fully-automated scanning and/or treatment may be provided. For example, the robot arm moves the nuclear probe 12 by hovering over the patient in a pre-defined pattern, without needing to touch the patient's skin. The probe 12 is moved over a motion path that can be used to produce a 2D and/or 3D SPECT reconstruction. The automated movement may provide a fixed or regular pattern of detection, allowing for computationally more efficient reconstruction as compared to freehand movement. Greater accuracy and/or quality of image data may result. A 2D or 3D map of locations of higher radionuclide uptake ("hotspots") are detected and visualized. An optional registration step with pre-acquired 3D PET/SPECT may further enhance the reconstruction results, providing anatomy information associated with the detected radiation.

In an alternative embodiment, the robotic assembly 11 is or includes a raster scanner arrangement. A pan and a tilt stage form the raster scanner arrangement. The nuclear probe 12 is mounted within or on the pan. The mount is moveable, allowing the nuclear probe 12 to be laterally positioned along one or two-dimensions within the pan. The tilt stage connects with the pan or connects to the nuclear probe 12. The tilt stage changes the angle of the pan and/or nuclear probe 12 relative to the patient. By translation within the pan and/or tilting, radiation may be detected along different lines through a volume of the patient. The raster scanner is positioned manually or automatically (e.g., using a track and/or arm and joint arrangement) above, beside, against, or adjacent to the patient for detecting radiation.

The user input 36 is a button, a keyboard, a rocker, a joy stick, a trackball, a voice recognition circuit, a mouse, a touch pad, a touch screen, sliders, switches, combinations thereof, or any other input device for sending commands. For example, the user input 36 is a mouse or trackball with associated buttons for indicating a region of interest on an image. A pointer is positioned to indicate diagonally opposite corners for a quadrangular region of interest, points on a border for any shaped region, or tracing of the entire border. Button activation is used to indicate selection of particular points at the pointer location. A region of interest may be extrapolated or interpolated from the user selected points. Edge detection based on the user indicated points may be used to complete the region designation.

The region is designated on an image from any source. The image may be a camera view of the patient, a pre-operative image, or other image, allowing the user to indicate the region of interest on the patient on the image. The user input 36 and processor 30 receive the user input information. Alternatively, the processor 30 performs image processing to find the region. In yet other embodiments, the user positions the robotic assembly relative to the patient to indicate the region of interest.

The memory 32 is a graphics processing memory, video random access memory, random access memory, system memory, cache memory, hard drive, optical media, magnetic media, flash drive, buffer, database, combinations thereof, or other now known or later developed memory device for storing data or image information. The memory 32 is part of an imaging system, part of a computer associated with the processor 30, part of a database, part of another system, or a standalone device.

The memory 32 stores one or more datasets representing detected radiation projections (e.g., samples), volume or image reconstruction, images, thresholds, and/or segmentation information (e.g., number and/or size of lesions). Data from different scans with the probe 12 at different locations is stored for reconstruction. Templates or selectable patterns for robotic positioning of the probe 12 may be stored.

Other types of data may be stored. Information about the number and/or size of radioactively marked nodes is obtained from a scintigraphy or SPECT scan. For example, a SPECT volume reconstructed from a scan of the patient is stored as pre-operative diagnostic scan data. The processor 30 may process the volume in a region of interest to determine the number and/or size of lesions of interest. Alternatively, the memory 32 stores previously extracted or user input numbers and/or sizes of lesions of interest.

In either case, an expected number of separate lesions to be biopsied or operated on is determined and stored. The size of the separate regions, such as volume, circumference, cross-sectional area, radius, or diameter, may also be stored. Other information than number or size may be used, such as the location, separation, or shape.

Other types of pre-operative information may be stored. For example, CT or MRI data is acquired prior to intervention, such as just prior to (same day) or during a previous appointment on a different day. The data represents tissue, preferably in a high resolution. The anatomy-based pre-operative data may be used for overlaying functional information from the probe 12. For example, a CT, MRI, or ultrasound image is generated. A reconstruction from radiation detections is used to create a color overlay on the image showing hotspots.

The memory 32 or other memory is a non-transitory computer readable storage medium storing data representing instructions executable by the programmed processor 30 for robotic navigation in nuclear probe imaging. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 30 is a computer that controls the robot 11, performs the reconstruction, and/or performs segmentation and quality checks. The processor 30 controls a number of scans performed based on a measure of quality of the reconstruction resulting from the samples of the scans. Instead of the processor 30 being a CPU, a GPU-based system can be employed to increase the reconstruction speed.

The processor 30 is a general processor, central processing unit, control processor, graphics processor, graphics processing unit, digital signal processor, three-dimensional rendering processor, image processor, application specific integrated circuit, field programmable gate array, digital circuit, analog circuit, combinations thereof, or other now known or later developed device for controlling the robotic assembly 11, controlling the detection of radiation, reconstruction, segmenting, measuring quality, and/or image generation. The processor 30 is a single device or multiple devices operating in serial, parallel, or separately. For example, the processor 30 is one computer for controlling the robotic assembly 11 and another computer for performing reconstruction, including segmentation and measuring of quality. The processor 30 may be a main processor of a computer, such as a laptop or desktop computer, or may be a processor for handling some tasks in a larger system, such as in an imaging system (e.g., SPECT system 22). Based on hardware, software, or combinations thereof, the processor 30 is configured to implement instructions or perform acts.

The processor 30 is configured to perform an initial scan of the patient. The robotic assembly 11 is controlled to position the probe 12 at different locations and/or to travel over a region of interest of the patient. The processor 30 controls the robotic assembly 11 to position the probe 12 at a particular number of sampling points for detecting radiation. The number is a minimum or number expected to be able, barely able, or even not able to generate enough radiation samples to reconstruct the region of interest to have the pre-determined number of lesions and/or sizes of lesions.

The processor 30 is configured to control movement of the robotic assembly 11 to scan the patient with the nuclear probe 12. The processor 30 instructs the robotic assembly 11 to position the nuclear probe 12 at different positions. The processor 30 feeds coordinates and/or directions and amounts of movement to the robotic assembly 11. Alternatively, the processor 30 sends commands to specific motors, joints, encoders, sensors or other components of the robotic assembly 11 to control the specific components. The robotic assembly 11 operates based on the instructions to move the nuclear probe 12 to specific locations.

The processor 30 controls each movement individually. Alternatively, the processor 30 sends a sequence of movements or a reference to a specific sequence of movements. The robotic assembly 11 moves, based on control from the processor 30, the nuclear probe 12 to different locations for obtaining radiation readings along different lines or beams through the patient.

Based on the control, the robotic assembly 11 moves the nuclear probe 12 in a pattern. The pattern is defined by locations and angles from which the nuclear probe 12 detects radiation. For each location in three-dimensional space, the nuclear probe 12 is oriented at a particular direction towards the patient. A projection reading along the corresponding cone or line is performed. At the same location, another reading may be performed with the nuclear probe 12 at a different angle, reading along a different cone or line. This change in angle or a change in three-dimensional coordinate or space represents a different sampling location. The pattern provides for different sampling locations or provides for different spatial locations of the probe 12 to be used for different orientations. The pattern includes translation and/or rotation of the nuclear probe 12 to acquire data along beams from different locations and/or rotations relative to the patient. The pattern corresponds to positions and/or angles for receiving the radiation along lines in a volume of the patient.

The pattern is regularly spaced. The regular spacing is for the lines within the patient, intersection of the lines with the patient surface, and/or for the positions to detect radiation from the patient. By using the robotic assembly 11, the nuclear probe 12 may be positioned to scan at a regular spacing. Projections along lines or cones with a known spacing along one or two dimensions may be provided. Projections along lines or cones with known angle increments may be provided. Regular spacing may lead to more efficient image reconstruction.

The pattern may be at a desired density. Lesser density may be used for more rapid scanning for radiation. Greater density may be used for less rapid scanning for radiation. Using lesser density initially with progressively adding more samples as resulting reconstructions are tested may allow for a minimum number of sampling locations to provide sufficient or desired resolution.

Irregular spacing may be used, such as where the irregular pattern provides for increased information content for desired regions. For example, an irregular pattern is used for subsequent scans or progressively added samples. The previous reconstruction may indicate general locations of hotspots, so the pattern may focus on or be only for the hotspots or the hotspots and immediately surrounding locations. Alternatively, subsequent sampling uses the same or different regularly spaced pattern for the entire region of interest.

The processor 30 calculates the pattern or selects the pattern from a library. Alternatively, a template pattern is provided or selected and modified. The pattern may be based on a three-dimensional surface of the patient. Different patients have different surfaces, such as a surface detected with a camera and laser or light grid projected on the surface. These differences are accounted for in establishing the pattern. Using the three-dimensional surface, the positions of the nuclear probe 12 for radiation detection are set. For example, each position is a given distance (e.g., 5-20 cm) away from the surface. The distance is based on a normal to the surface for each location or is based on the beam distance given an orientation of the nuclear probe 12. For example, the probe 12 is always oriented for one pass at vertical, so the distance is from the vertical. Given a desired sampling density and the distance, the probe 12 locations are determined in three-dimensional space. As another example, the probe 12 is used at different angles for each location, so the normal to the three-dimensional surface is used for distance.

The pattern may be selected or created, at least in part, based on hotspots. After performing a standard or predefined pattern initially, subsequent patterns for that examination of that patient are also standard or are created or selected for focus on hotspots. A greater density of sampling locations is provided for lines through or adjacent to one or more hotspots.

The processor 30 is configured to reconstruct a volume from the detected radiation. A three-dimensional distribution of detected emissions caused by the radionuclide or tracer is formed from the detected samples. The processor 30 is configured to tomographically reconstruct voxels representing the volume. The reconstruction is from the radiation projections of the regularly spaced lines or cones of the pattern. Using the collected measurements at different translations and/or orientations, image reconstruction is performed using any now known or later developed process, such as a SPECT reconstruction using maximum likelihood expectation maximization. The translation and orientation measurements are readily available from the robotic arm, allowing precise and regular positioning of the projection information.

The reconstruction is three-dimensional, but may be one or two-dimensional. The probe 12 is moved in a plane or along a curved surface. For each sample location along the plane or surface, a measurement of radiation along an orthogonal line is made. Using the relative positions determined from the pattern, the relative position of each measurement is provided. The relative position of the measurement lines or regions is mapped. A regular sampling may be interpolated. A two-dimensional set of data is provided where the magnitude at each location represents the radiation along an orthogonal line and the probe is moved in two dimensions. Since a nuclear activity probe 12 produces a one-dimensional reading, the probe's motion is used to reconstruct either a 2D or a 3D SPECT image from the data acquired by the detector. The motion information, such as in the form of the pattern of sampling locations, may be directly utilized for SPECT reconstruction of nuclear data. The location information is provided by the processor 30 or the robotic assembly 11.

In one embodiment, a three-dimensional reconstruction is assisted by data from lines at different angles. As the probe 12 is translated, the probe 12 may also be tilted to different angles. As a result, depth information may be derived. Each voxel location contributes to measurements by the detector at different times. These locations are distributed in three-dimensions in the volume. The tilt angles for the measurements and position information may be used to reconstruct the distribution of radiation. Any tomographic reconstruction process may be used, such as filtered back projection or iterative reconstruction.

The processor 30 is configured to reconstruct progressively. An initial scan of the patient is performed and the volume of the patient is initially reconstructed from samples of the initial scan. The processor 30 is configured to check the reconstruction to see if a sufficient (e.g., threshold) quality is met. If not, a further scan is performed under the control of the processor 30. The processor 30 adds the resulting additional radiation samples to the previously acquired samples, and performs the reconstruction again with the extra or progressively acquired detected emissions. Due to the greater number of samples by adding more in each repetition, the subsequent reconstruction may have a greater resolution. The processor 30 repeats the process until the resulting reconstruction or reconstructed volume meets the criterion or criteria for quality.

Any measure of quality may be calculated by the processor 30. For example, a resolution is calculated. As another example, filtering or other image processing is used to measure severity of artifacts and/or spatial frequency. In yet another example, variance or gradients are used to calculate the measure. The quality is of the reconstructed volume, so is a measure calculated from voxels of the reconstruction. Other information, such as settings or values of variables used in reconstruction, may be used.

In one embodiment, the quality is a number and/or size of lesions represented in the reconstruction. For example, the repetition is terminated when a number of lesions equals a number of expected lesions. A processing loop is performed until the quality of the scan reaches the quality threshold. In the processing loop, scans are performed and reconstructions created. Each reconstruction is measured by segmenting or otherwise determining a number of separate lesions represented in the volume. With insufficient samples, multiple lesions may be represented as a single hotspot. As samples are added, the resolution increases, resulting in more distinct lesions or hotspots being represented.

The number of expected lesions is loaded from the memory 32. The user may input an expected number. Alternatively, the number of expected lesions is segmented from a pre-operative PET or SPECT reconstruction. The process for determining the number of expected lesions may be the same or different than for determining the number in the reconstructed volume from the probe 12.

In one embodiment, a segmentation of the reconstructed volume is performed with an iterative leveling algorithm. The reconstructed volume may be low pass filtered or processed before or as part of segmentation. A series of thresholds defining ranges and/or single thresholds are applied. The threshold or thresholds that provide lesions within a % of expected size are selected as the threshold to use. Other segmentation may be used, such as region growing from a seed point with maximum intensity or center of gravity. Gradient processing may be used.

The number of separate regions represented in the segmented reconstructed volume is counted. The separate regions are unconnected, so have at least one voxel of separation.

The sizes of the separate regions are calculated as the criteria representing quality in alternative or additional embodiments. The size is calculated as a volume, but may be calculated as a radius, diameter, circumference, cross-sectional area, or surface area.

The number and/or size of the separate regions are compared with expected values used as thresholds. For example, four lesions are expected. If the segmentation shows only three, then the number is below the expected number. As another example, lesions of two different sizes are expected. The segmented lesions have three different sizes, one of which is not within a % error range (e.g., 50%) of the expected size. In yet another example comparison, the number and size of the lesions are compared to the expected. If either is not met, then the scanning and reconstruction are repeated.

A threshold is used to determine meeting the quality. In the number and/or size examples above, the threshold is the expected number and/or size or sizes. The threshold may include an error range, such as within +/−1 for the number or any % or offset value for the size. If the measured quality is below the threshold, then the loop continues. If the measured quality is at the threshold then the loop terminates. If the measured quality exceeds the threshold, then an error may be provided or the loop may terminate (e.g., expected 3, but jumped from 2 in one iteration to 4 in the subsequent reconstruction).

Where the loop continues, another scan of the patient is performed. The processor 30 is configured to control the robotic assembly 11 to further move the nuclear detector probe 12 relative to the patient in a same or different pattern. For example, locations are selected based on the hotspots of the most recent reconstructed volume. Instead of adding additional samples uniformly distributed in the region of interest of the patient, the sample detection is directed at the hotspots, the regions where two nodes potentially need to be separated.

Using the progressively acquired samples, the reconstruction is repeated. The volume is reconstructed with the additional samples. The detected radiation from all or some of the previous scans is used with the detected radiation from a most recent scan to reconstruct the volume. To speed reconstruction processing, one of the previously reconstructed volumes, such as a most recent one, may be used as a starting solution in the reconstruction. The resulting reconstruction is tested for quality.

Other checks may be performed. For example, the number of scans, sample locations, and/or samples is used. In one embodiment, if the number of samples acquired reaches a threshold or exceeds a predefined limit, the loop terminates. The reconstruction associated with the samples acquired to reach the maximum or even samples beyond the maximum due to timing of the quality check relative to the scanning is used, and the loop terminates.

The processor 30 uses the last reconstructed volume for generating an image. The reconstructed volume represents the radiation at different voxels. The voxels may be used to generate a rendering of the volume to an image. Alternatively, the reconstruction is of a two-dimensional image without reconstructing to the volume. The generated image is output for display.

The processor 30 may process the reconstructed data and/or the image. For example, filtering, interpolation, decimation, segmenting, highlighting, graphical overlays or other processing is performed.

The processor 30 may combine functional and diagnostic information. For example, the functional information from radiation detection is represented by a color or graphic overlay on an anatomical image. Locations associated with detected radiation above a certain amount are highlighted in a spatially aligned diagnostic image.

The display 34 is a monitor, LCD, projector, plasma display, CRT, printer, or other now known or later developed device for outputting visual information. In other embodiments, the display 34 is part of a smart phone or other mobile computing device. The display 34 receives images, graphics, or other information from the processor 30, memory 32, or SPECT system 22. The image is created by the processor 30 using the reconstructed volume from the last repetition of the reconstruction. The reconstructed volume from other than the last repetition may be used.

The display 34 provides one or more images representing anatomy and/or function. The images may be a combination of multiple sources of information, such as representing anatomy highlighted in color based on function. The images are reconstructed planar images from a scanned volume, are two-dimensional planar images as scanned, and/or are three-dimensional renderings.

In an alternative embodiment, the display 34 is a head mounted display. Images representing augmented reality are displayed. For example, functional imaging information (e.g., detected radiation uptake), three-dimensional surface information, or both are displayed adjacent to or overlaid on live video images of the patient or overlaid on a screen so that the overlays appear in alignment with a live view of the patient. During an interventional procedure, a physician may view images of the acquired and segmented radiation data fused with a current view of the patient. This may assist the physician with visual cues and guidance for an ongoing operation.

Figure 4:
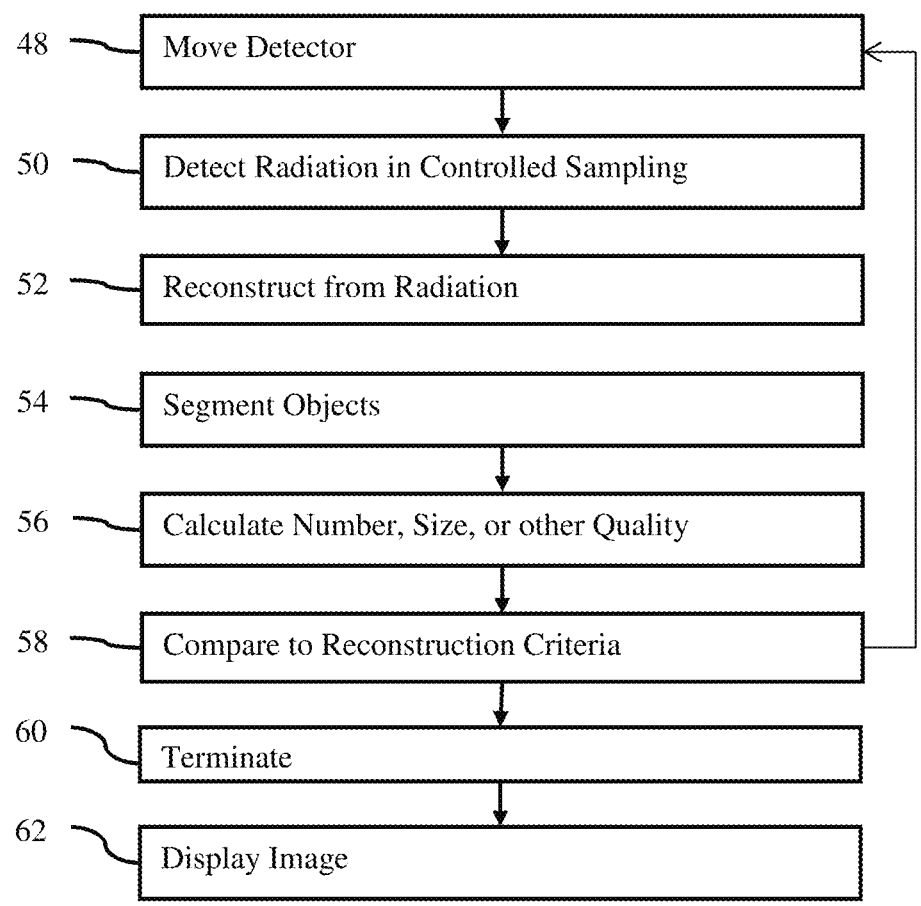
FIG. 4 is a flow chart diagram of one embodiment of a method for robotic navigation in nuclear probe imaging.

FIG. 4 shows a method for robotic navigation in nuclear probe imaging. The method is implemented by the robotic assembly 11, nuclear probe 12 and/or processor 30 of FIGS. 1-3, the system of FIG. 3, or another system. The acts are performed in the order shown or other orders. Additional, different, or fewer acts may be provided. For example, the display act 62 is not provided, but instead the reconstruction is used to control therapeutic application.

In act 48, a detector is moved to the regularly spaced locations about the patient. A processor controls a robot to position a nuclear probe at different locations relative to the patient. As represented in the feedback loop of FIG. 4, movement and corresponding detections for scanning are repeated, providing a sequence of scans.

The detector is moved to cover a pattern. The detector is translated and/or rotated about the patient. The detector is moved to sample at each location in the pattern. Regularly spaced locations are established. Regular spacing includes evenly spaced, such as all adjacent sample locations being spaced apart by a same distance orthogonal to the normal with the surface and all angles being separated by the same amount. Other spacing may be used, such as a pattern including variance in the spacing, but with a predictable or known pattern, such as more density of evenly spaced sample locations in a region of interest and decreasing density as a function of distance away from the region of interest.

The locations are for lines in the volume of the patient and/or for locations of the probe during detection. A location at a three-dimensional coordinate position may be associated with different angles of incidence of the projection line for radiation detection. By varying the angle, additional sampling locations result.

The locations are established based on a region to be scanned. The region may be a segmented portion of the patient, such as identifying breast tissue in an x-ray or computed tomography image or identifying a portion of the patient associated with the breast. The region may be indicated by the user, such as a region of interest. For example, the user may indicate a region of interest on an image of the surface or by locating the robot at corners of a region relative to the patient. The surface is associated with a top of the region and the volume beneath the surface for a set distance or to the patient table defines the volume of interest.

Given the spatial boundary for detecting radiation, the number of angles along which linear projections are to be acquired is determined. The number may be user settable, based on speed, resolution, or quality selections, or predetermined. The pattern may be limited to be acquired from non-interfering locations of the robotic assembly, such as avoiding sampling from locations where a physician is to work.

Given the spatial boundary for detecting radiation, the density or sampling distribution of locations is determined. Based on speed, quality, resolution and/or predetermined templates, the distribution within the volume is determined. For example, fifty locations are to be sampled at a given angle along one dimension. Where the volume extends 10 cm along that dimension, then the locations are established at every 20 mm. As another example, the density is established and then fit to the volume, such as desiring 30 mm sample interval so that 40 locations are set for 12 cm length along a given dimension.

The pattern for each possible angle is the same or different. For example, the pattern is set based on coordinates and then repeated for different angles. Alternatively, the patterning for the angles is established with the coordinates in a comprehensive pattern.

The user selection of the region of interest, field of view, density, number of angles, resolution, quality or other setting may be used to establish the pattern. Alternatively, the pattern is set based on processor determined information or a predetermined setting.

Where the pattern is not for the detector itself, the pattern is extrapolated to determine detector locations. The pattern for the detector accounts for the surface of the patient. The locations in the pattern for the detector are spaced from the patient surface by a same amount or predetermined amounts for each location. In alternative embodiments, different distances for different locations may be used.

Any path of travel may be used, such as detecting at different angles at each location before moving to another location and moving between locations along a line before shifting to another line. In other examples, a region growing approach is used where any unsampled adjacent locations are sampled before moving to another unsampled adjacent position.

In act 50, radiation is detected. The detector detects radiation at the regularly spaced locations. At each of the locations, the detector is activated or allowed to detect radiation for a time. Any time may be used. The detector is deactivated for moving to other locations. Alternatively, the detector continues to detect as moved. The location of the detector, angle of the detector, and corresponding line or beam within the volume is associated with any detected radiation.

The detector is aimed such that the radiation being detected is from within the patient. The radiation is detected along a beam (e.g., cone) at each of the regularly spaced locations. Radiation projection information is received from the nuclear probe for different positions and/or orientations.

The sources of radiation are taken up, transferred, or pooled, showing the function of anatomy. For example, the amount of tracer taken up by brain tissue indicates the functioning of the brain tissue. As another example, distribution of the tracer in the cardiac system shows operation of the cardiac system. In other embodiments, the tracers are tagged to bind to or otherwise collect based on function. For example, the radionuclides bind to cancer or show glucose uptake. Any now known or later developed functional imaging may be used.

The level or magnitude of radiation along lines at different locations is detected. Radionuclides, radioactive tracer, or other sources of radiation in the patient generate positrons or gamma rays. The detector senses the gamma rays or other radiation. The detector detects radiation along a line, such as a cone shaped region extending from the detector. As the detector moves, the radiation at different locations is measured. The measurements provide a two-dimensional map of radiation emitted in a projection along a third dimension or a one-dimensional map of radiation emitted in a projection along a plane.

With rocking or tilting of the detector, measurements for projections through the same volume, but at different angles, are obtained. These measurements may be converted into a three-dimensional map of radiation emission, providing measurements in three-dimensions instead of projections along one or two dimensions.

For converting the projection information into data representing a plane or volume, an image or distribution of radiation may be reconstructed by a processor in act 52. The radiation projection information is used to reconstruct the radiation from different voxels, pixels, or locations within the patient rather than along lines. The projections of the radiation along the beams are reconstructed into data representing points, pixels, or voxels (e.g., three-dimensional distribution of detected radiation). While radiation from different locations in the volume or plane is reconstructed, this reconstruction may be referred to as image reconstruction. The reconstructed plane or volume may be used to generate an image.

The reconstruction uses the spatial information for each projection. The location and orientation of the line associated with the projection is used. Since the robotic assembly provides for sampling regularly spaced locations, the reconstructed data may have a better quality, be performed more accurately, and/or be performed more efficiently. In addition to the projection locations, a three-dimensional surface of the patient may be used in the reconstruction. The surface indicates a boundary for the radiation. The radiation is from within the patient, not outside the patient. The location of the radiation is limited during reconstruction. This limitation may speed the reconstruction and/or result in better quality reconstruction.

In act 54, the reconstructed distribution is segmented by a processor. Regions are located in the distribution. The regions are of relatively higher radioactive concentration, such as hotspots. Thresholding or other segmentation is performed. Voxels or pixels associated with lesions or uptake are distinguished from those not associated with lesions or uptake.

In act 56, the number of contiguous regions is counted by a processor or the user. For example, two completely separate or non-touching regions are located by segmenting. Alternatively or additionally, the sizes of the regions are calculated. The area or volume is determined. Other measures of size may be used.

Other measures of quality than number of regions or sizes of regions may be used. For example, the shape of the regions is used. Different shapes may be correlated with the segmented region to identify a scale, orientation, and/or type of shape.

The number, size, and/or other measure of the reconstruction are used as criteria to indicate quality of the reconstruction. In act 58, the calculated criterion or criteria are compared to corresponding threshold or thresholds by a processor. For example, the number of regions segmented from the initial reconstruction is compared to a pre-determined number. The predetermined number is an expected number of regions, such as determined by user input or extracted from another examination (e.g., PET or SPECT). As another example, the sizes of the regions are compared to an expected size and tolerance or to expected sizes and tolerances. In yet another example, a shape or shape characteristic is compared to an expected or pre-determined shape or shape characteristics. More circular shapes or a shape determined from a pre-operative SPECT exam are compared to the shape fit to the segmented region.

The comparison determines whether to progress to act 60 or whether to feedback or loop to act 48. If the quality is below the threshold, such as the number of separate contiguous regions being below the expected number, then further scanning (e.g., repeating acts 48 and 50) and reconstruction (repeating act 52) are performed. The scanning and reconstruction are repeated to gather additional samples.

The repetition of the moving and detection of acts 48 and 50 use the same or different pattern of locations and/or orientations. For different patterns, the regions segmented from the previous reconstruction in act 52 may be used or a pre-determined but different pattern is used. For example, the pattern more sparsely samples the entire region of interest but samples hotspots from the previous reconstruction with a greater density. The greater density may be provided at fewer than all the hotspots, such as only for hotspots larger than the expected size. The quality measurement or other processing may also indicate areas that need denser sampling because of the low reconstruction quality in these areas. The density of sampling is alternatively uniform throughout the pattern.

In the repetition of act 52, the detected radiation samples from the repetition of acts 48 and 50 are added to the previous radiation samples from earlier performances of acts 48 and 50. The number of samples is progressively built up by repeating acts 48 and 50. For each progression, a reconstruction is performed in act 52. This progressive reconstruction uses the samples or data from detections of the current repetition as well as from previous (e.g., all) performances of the scanning. The greater number of samples may result in a greater quality of the reconstruction.

The quality of the reconstruction is built up progressively by the repetitions until the quality criteria or criterion is satisfied. The segmentation of act 54 is repeated. The currently reconstructed distribution is segmented. The number, size, and/or other quality are calculated from the segmented information in the repetition of act 56. In the repetition of act 58, the quality information is again compared to the expected criteria or criterion. Where the quality is not satisfied according to the comparison with the threshold or thresholds, scanning, reconstruction, and quality checking is repeated again. Any number of repetitions may be performed. For example, the repetition results in separation of one hotspot into two, resulting in three total separate regions. Where the expected number is four, the repetition continues until four separate regions are found.

The comparison of act 58 in the initial reconstruction or for any subsequent reconstruction may indicate sufficient quality of the reconstruction. For example, the number and/or size(s) of the regions match or are within tolerance of an expected number and/or size(s). In act 60, the sequence of scanning or repetitions is terminated. Where the quality is sufficient, the repetition ceases. The measure of the most recent reconstruction of the portion of the patient satisfies the criterion or criteria, so scanning may end. Alternatively, the scanning for a given image or volume ends, and the method is started again to create another image or volume.

Other termination may be used. For example, a limit on the total number or on the number of samples per area is set. If the limit is exceeded, regardless of the comparison of act 58, then the scanning and reconstruction terminates in act 60.

In act 62, an image of the reconstructed volume or three-dimensional distribution is displayed. The image represents radiation at different locations. The progressive collection of radiation measures over the various repetitions is used. The last or most recently created reconstruction is used to generate the image.

The image is rendered from the volume data, such as using maximum intensity, alpha blending, or other rendering from a given viewing direction. The viewing direction may be from the three-dimensional scan camera view point, from a physician's view point, or from other viewpoints. Alternatively, the image is a two-dimensional reconstruction. By moving the detector to different locations, a two-dimensional map of hotspots may be created. The image of the two-dimensional map is generated.

Optionally, the positions of the hotspots are identified, such as by image processing, segmenting or thresholding. The detector is moved to acquire radiation along different lines or cones at different angles through each of the hotspots. A three-dimensional reconstruction may be formed from the radiation along these lines. This reconstruction represents the volume of the patient. The reconstructed data may be registered with preoperative PET or SPECT scans.

Other images may be displayed with the functional or radiation image. For example, preoperative images, such as from computed tomography, magnetic resonance, or ultrasound, may be displayed.

Real-time 2D/3D SPECT from the nuclear probe may be fused with pre-acquired PET and/or SPECT datasets from 3D tomographic scanners. This may be useful in order to get a better delineation of lesions by matching approximate SPECT reconstructions from the real-time robotically positioned probe with accurate PET/SPECT reconstructions from 3D tomography.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A system for robotic navigation in nuclear probe imaging, the system comprising:
   a nuclear detector for detecting radiation;
   a robotic assembly connected with the nuclear detector, the robotic assembly configured to move the nuclear detector in a first pattern relative to a patient, the first pattern sampling from different measurement lines, the nuclear detector providing first samples from the sampling of the first pattern;
   a processor configured to reconstruct a volume as a first reconstruction from the first samples of the detected radiation from the different measurement lines, to control the robotic assembly to further move the nuclear detector relative to the patient after the sampling in the first pattern where a calculated quality of the reconstructed volume is below a threshold measure, the further movement acquiring second samples of further detected radiation, and to repeat the reconstruction of the volume as a second reconstruction from both the first samples of the detected radiation and from the second samples of the further detected radiation from the further movement.

2. The system of claim 1 wherein the robotic assembly comprises a robot arm connected with the nuclear detector and a base configured to be stationary during movement of the robot arm.

3. The system of claim 1 wherein the robotic assembly comprises a raster scanner comprising a pan and a tilt stage, the nuclear detector moveable within the pan.

4. The system of claim 1 wherein the nuclear detector comprises a gamma detector.

5. The system of claim 1 wherein the processor is configured to measure the quality as a function of a number of objects in the reconstructed volume.

6. The system of claim 5 further comprising a memory, the memory configured to store an expected number of the objects as the threshold, and wherein the processor is configured to segment the objects from the reconstructed volume and compare the number of the objects segmented from the reconstructed volume with the expected number of the objects in the memory as the threshold.

7. The system of claim 1 wherein the processor is configured to measure the quality as a function of a size of objects in the reconstructed volume.

8. The system of claim 7 further comprising a memory, the memory configured to store an expected size of the objects, and wherein the processor is configured to segment the objects from the reconstructed volume and compare the size of the objects segmented from the reconstructed volume with the expected size of the objects.

9. The system of claim 1 wherein the processor is configured to repeat the control for the further moving and the reconstruction until the reconstructed volume meets the threshold measure of the quality.

10. The system of claim 9 wherein the processor is configured to terminate the repetition when a number of samples of the detected radiation reach a limit.

11. The system of claim 1 wherein the processor is configured to repeat the reconstruction of the volume using the previously reconstructed volume as an initial solution.

12. The system of claim 1 wherein the processor is configured to control the robotic assembly to further move to locations relative to the patient based on hotspots from the reconstructed volume.

13. The system of claim 11 further comprising a display configured to display an image of the reconstructed volume from a last repetition of the reconstruction.

14. In a non-transitory computer readable storage medium having stored therein data representing instructions executable by a programmed processor for robotic navigation in nuclear probe imaging, the storage medium comprising instructions for:

controlling a robot to position a nuclear probe at different locations relative to a patient in a sequence of scans of the patient;

progressively reconstructing a portion of the patient from data of the nuclear probe after each of the scans, the data for a subsequent reconstruction resulting from the progressively reconstructing includes samples used for previous reconstructions from previous scans of the sequence and includes samples of a most recent scan of the sequence, the samples from the most recent scan of the sequence not included in the previous reconstructions; and repeating the sequence when a calculated quality of a most recent reconstruction of the portion is below a threshold measure.

15. The non-transitory computer readable storage medium of claim 14 wherein the sequence is terminated when a number of objects in the most recent reconstruction equals a criterion, the criterion comprising an expected number of objects.

* * * * *